United States Patent
Katogi et al.

(10) Patent No.: US 6,938,429 B2
(45) Date of Patent: Sep. 6, 2005

(54) REFRIGERATING AND AIR-CONDITIONING SYSTEM

(75) Inventors: Kenichiro Katogi, Fujieda (JP);
Hidefumi Uesugi, Shizuoka (JP);
Masashi Watanabe, Shizuoka (JP);
Yasutaka Inaba, Shizuoka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/694,060

(22) Filed: Oct. 28, 2003

(65) Prior Publication Data

US 2004/0211202 A1 Oct. 28, 2004

(30) Foreign Application Priority Data

Oct. 30, 2002 (JP) .......................................... 2002-315992
Mar. 28, 2003 (JP) .......................................... 2003-089569

(51) Int. Cl.[7] .............................. F25B 7/00; F25B 41/00; F25B 49/00
(52) U.S. Cl. ............................... 62/175; 62/203; 62/207; 62/228.1; 62/331
(58) Field of Search .......................... 62/175, 203, 207, 62/228.1, 230, 331

(56) References Cited

U.S. PATENT DOCUMENTS

| | | | | |
|---|---|---|---|---|
| 4,519,217 A | * | 5/1985 | Phillips et al. ................ | 62/256 |
| 5,440,894 A | * | 8/1995 | Schaeffer et al. .............. | 62/203 |
| 6,131,401 A | * | 10/2000 | Ueno et al. .................... | 62/175 |
| 2004/0163396 A1 | * | 8/2004 | Starling et al. ............... | 62/127 |

* cited by examiner

*Primary Examiner*—Marc Norman
(74) *Attorney, Agent, or Firm*—Antonelli, Terry, Stout & Kraus, LLP

(57) ABSTRACT

A refrigerating and air-conditioning system includes a refrigerating machine connected to a showcase by a first refrigerant flow passage, an air-conditioning apparatus for connection of an indoor equipment and an outdoor equipment by means of a second refrigerant flow passage, which forms a different refrigerant circuit from a refrigerant circuit formed by the first refrigerant flow passage, and a centralized control unit for controlling the refrigerating machine and the air-conditioning apparatus, the centralized control unit configured to reduce a cooling operation set temperature in the air-conditioning apparatus relative to a fixed value according to a load on the showcase. When a load on the showcase increases, an indoor temperature is reduced by the air-conditioning apparatus so that a load on the showcase is reduced, reduction in operating efficiency of the refrigerating machine is suppressed, and an improvement in energy saving quality is achieved.

8 Claims, 5 Drawing Sheets

REFRIGERATING AND AIR-CONDITIONING SYSTEM

BACKGROUND OF THE INVENTION

1. Field of the Invention

The present invention relates to a refrigerating and air-conditioning system, and more particular, to a refrigerating and air-conditioning system, in which a refrigerating apparatus and an air-conditioning apparatus, respectively, have independent circulation flow passages.

2. Related Art

In order to improve the energy saving quality of a refrigerating apparatus, which comprises showcases installed in a store and so on for refrigeration and cold storage, and a refrigerating machine, it has been proposed to connect the showcases and the refrigerating machine together via communication lines to control an operating set pressure of a compressor, which is provided in the refrigerating apparatus, in view of a situation such as a load on the showcases, that is, a refrigeration or cold storage load on the showcases to vary an operating frequency of the compressor for capacity control (for example, JP-A-8-271063, pages 4 to 6, FIG. 2).

Meanwhile, an air-conditioning apparatus is mounted in a store or the like together with a refrigerating apparatus. Therefore, there has been proposed a refrigerating and air-conditioning system, in which a refrigerating apparatus and an air-conditioning apparatus, respectively, having independent circulation flow passages are combined together and when the air-conditioning apparatus runs in heating operation, exhaust heat from the refrigerating apparatus is recovered to condense a refrigerant in the air-conditioning apparatus for an improvement in energy saving quality. In such refrigerating and air-conditioning system, a refrigerating machine is provided with a heat recovery mechanism, which includes a heat exchanger capable of conducting heat to a heat exchanger provided in an outdoor equipment of the air-conditioning apparatus, and there is provided a control unit connected electrically to a control unit of the refrigerating apparatus and a control unit of the air-conditioning apparatus to actuate the heat recovery mechanism of the refrigerating apparatus when the air-conditioning apparatus runs in heating operation (for example, JP-A-2001-289532, pages 5 to 10, FIGS. 1 and 16).

Conventional refrigerating apparatus automatically reduces a set pressure (suction pressure) of a compressor for a refrigerating machine trying to follow an increase in a load on showcases, when showcases are increased in load to become high in operating efficiency. Therefore, a refrigerant is reduced in evaporating temperature, and the refrigerating machine is in some cases reduced in operating efficiency to be increased in power consumption. It has been desired that the energy saving quality be improved by suppressing an increase in power consumption, which is resulted from reduction in operating efficiency of the refrigerating machine.

Meanwhile, conventional refrigerating and air-conditioning systems are reduced in energy consumption when an air-conditioning apparatus runs in heating operation, but no consideration is taken of that reduction in energy consumption on a refrigerating apparatus side, which is caused by combining a refrigerating apparatus and an air-conditioning apparatus, respectively, having independent circulation flow passages together to form a refrigerating and air-conditioning system. Therefore, a refrigerating and air-conditioning system is desired, which can be improved in energy saving quality by combining a refrigerating apparatus and an air-conditioning apparatus, respectively, having independent circulation flow passages together to form a refrigerating and air-conditioning system.

SUMMARY OF THE INVENTION

It is an object of the invention to improve the whole energy saving quality of a refrigerating and air-conditioning system installed in a room in which a showcase is air-conditioned by an air-conditioning apparatus.

In order to solve the problem, the invention provides a refrigerating and air-conditioning system comprising a refrigerating machine connected to a showcase by a first refrigerant flow passage to form a refrigerating apparatus, an air-conditioning apparatus for connection of an indoor equipment and an outdoor equipment by means of a second refrigerant flow passage, which forms a different refrigerant circuit from a refrigerant circuit formed by the first refrigerant flow passage, and a centralized control unit for controlling actions of the refrigerating machine and the air-conditioning apparatus, and wherein the showcase is installed in a room air-conditioned by the air-conditioning apparatus, and the centralized control unit is configured to reduce an indoor set temperature set by the air-conditioning apparatus relative to a fixed value according to a load on the showcase for operation.

With such constitution, the centralized control unit for controlling actions of the refrigerating machine and the air-conditioning apparatus can reduce a set temperature of the cooling operation in the air-conditioning apparatus relative to a fixed value when a load on the showcases, that is, a refrigeration load and a cold storage load increase. Therefore, a room temperature in a store or the like, in which the showcases are installed, decreases to reduce a heating value of heat from an outside air, which makes a load on the showcases. Accordingly, even when a load on the showcases increases, a load on the showcases is reduced by the air-conditioning apparatus, which is relatively high in operating efficiency and small in energy consumption, and that reduction in operating efficiency of the refrigerating machine, which is caused by an increase in load on the showcases, is suppressed, so that the refrigerating machine is reduced in energy consumption and improved in energy saving quality.

Incidentally, showcases of refrigerating machines and refrigerating machines are in some cases manufactured by different manufacturers. In this occasion, in trying to connect the showcases and the refrigerating machine together via communication lines in order to know a loaded condition of the showcases, there is produced a need for communication equipments and wirings, conversion equipments of signals for correspondence of communication standards, and the like, thus bringing about complexity in a work of installation of the refrigerating apparatus and an increase in cost. Hereupon, the centralized control unit is configured to detect a loaded condition of the showcases making use of data indicative of an operating state of a compressor for the refrigerating machine. With such configuration, since data indicative of an operating state of a compressor for the refrigerating machine varies corresponding to a loaded condition of the showcases, the data can be used to judge the loaded condition of the showcases, thus enabling dispensing with communication lines between the showcases and the refrigerating machine.

Also, the centralized control unit uses an operating current and an operating frequency of the compressor provided in the refrigerating machine as data indicative of an operating state of the compressor, and is configured to calculate an average operating current and an average operating frequency for the operating current and the operating frequency in a certain set period of time, and to reduce a set temperature in the cooling operation of the air-conditioning apparatus relative to a fixed value according to the average operating current and the average operating frequency thus calculate.

Further, the centralized control unit is configured to acquire and store operation data of the compressor for the refrigerating machine, to judge the necessity of inspection of the refrigerating machine on the basis of the operation data of the compressor, and to output a signal, which informs such judgment, to the air-conditioning apparatus when inspection is judged to be necessary. In the case where any communication lines are not installed between the showcases and the refrigerating machine, it cannot be displayed on the showcases disposed inside a store that there is a fear of generation of abnormality in the refrigerating machine and inspection is necessary. With the constitution, however, since an indoor equipment and an outdoor equipment are surely connected to each other by communication lines, the air-conditioning apparatus can inform an interior of a store, in which a user is present, of the necessity of inspection of the refrigerating machine via the indoor equipment in the store and a remote control attached thereto irrespective of what portion of the air-conditioning apparatus is connected to the centralized control unit.

Further, the invention provides a refrigerating and air-conditioning system comprising a refrigerating machine connected to a showcase by a first refrigerant flow passage to form a refrigerating apparatus, an air-conditioning apparatus for connection of an indoor equipment and an outdoor equipment by means of a second refrigerant flow passage, which forms a different refrigerant circuit from a refrigerant circuit formed by the first refrigerant flow passage, and a centralized control unit for controlling actions of the refrigerating machine and the air-conditioning apparatus, and wherein the showcase is installed in a room air-conditioned by the air-conditioning apparatus, and the centralized control unit gathers operation data of the refrigerating machine and the air-conditioning apparatus to operate the refrigerating machine and the air-conditioning apparatus under an operating condition that energy consumption of both the refrigerating machine and the air-conditioning apparatus affords energy saving.

Here, it is preferable that the centralized control unit detects operation pressure, temperature, compressor frequency, abnormality signal, and protective control signal in the refrigerating machine, and operation pressure, temperature, compressor frequency, abnormality signal, and remote control set temperature in the air-conditioning apparatus to control the refrigerating machine and the air-conditioning apparatus on the basis of such detection data.

Also, it is preferable that when the air-conditioning apparatus runs in cooling operation and in the case where it is judged that a compressor operating frequency of the refrigerating machine is larger than a preset reference value and an operating load of the refrigerating machine is larger than a reference value even after the lapse of a predetermined period of time, and in the case where it is judged that a compressor operating frequency of the air-conditioning apparatus is smaller than a preset reference value and an operating load of the air-conditioning apparatus is smaller than a reference value even after the lapse of a predetermined period of time, the centralized control unit increases a compressor operating frequency of the air-conditioning apparatus to thereby reduce an operating load of the refrigerating machine and controls the air-conditioning apparatus and the refrigerating machine so that the whole refrigerating and air-conditioning system becomes best in operating efficiency.

Here, it is preferable that a reference set temperature in cooling operation is beforehand stored, and when in order to reduce an operating load of the refrigerating machine, a compressor rotating speed on a side of the air-conditioning apparatus is temporarily increased to reduce temperature in a room, the temperature is automatically returned to the reference set temperature after the lapse of a predetermined period of time to reduce power consumption of the air-conditioning apparatus.

In the case where it is judged that a compressor operating frequency of the refrigerating machine is smaller than a preset reference value and an operating load of the refrigerating machine is smaller than a reference value even after the lapse of a predetermined period of time, and in the case where it is judged that a compressor operating frequency of the air-conditioning apparatus is larger than a preset reference value and an operating load of the air-conditioning apparatus is larger than a reference value even after the lapse of a predetermined period of time, the centralized control unit increases a compressor operating frequency of the refrigerating machine to thereby reduce an operating load of the air-conditioning apparatus and can control the refrigerating machine and the air-conditioning apparatus so that the whole refrigerating and air-conditioning system becomes best in operating efficiency.

It is effective that when the air-conditioning apparatus runs in heating operation and in the case where it is judged that a compressor operating frequency of the refrigerating machine is larger than a preset reference value and an operating load of the refrigerating machine is larger than a reference value even after the lapse of a predetermined period of time, control is performed to reduce an indoor set temperature in the air-conditioning apparatus.

It is preferable that the refrigerating machine comprises a heat exchanger for exhaust heat, capable of conducting heat to a heat exchanger provided in the outdoor equipment of the air-conditioning apparatus, and the centralized control unit causes the first refrigerant to flow through the heat exchanger for exhaust heat, provided in the refrigerating machine when the refrigerating machine runs in cooling operation and the air-conditioning apparatus runs in heating operation, whereby heat discharged from the heat exchanger for exhaust heat is conducted to the heat exchanger provided in the outdoor equipment of the air-conditioning apparatus. With such constitution, an intake air temperature of the heat exchanger provided in the outdoor equipment of the air-conditioning apparatus can be increased by exhaust heat of the refrigerating machine at the time of refrigerant condensing, so that it is possible to enhance a heating capacity of the air-conditioning apparatus for a store and to further improve the energy saving quality.

Other objects, features and advantages of the invention will be made apparent from the following descriptions of embodiments of the invention with reference to the accompanying drawings.

DESCRIPTION OF THE PREFERRED EMBODIMENTS

Figure 1:
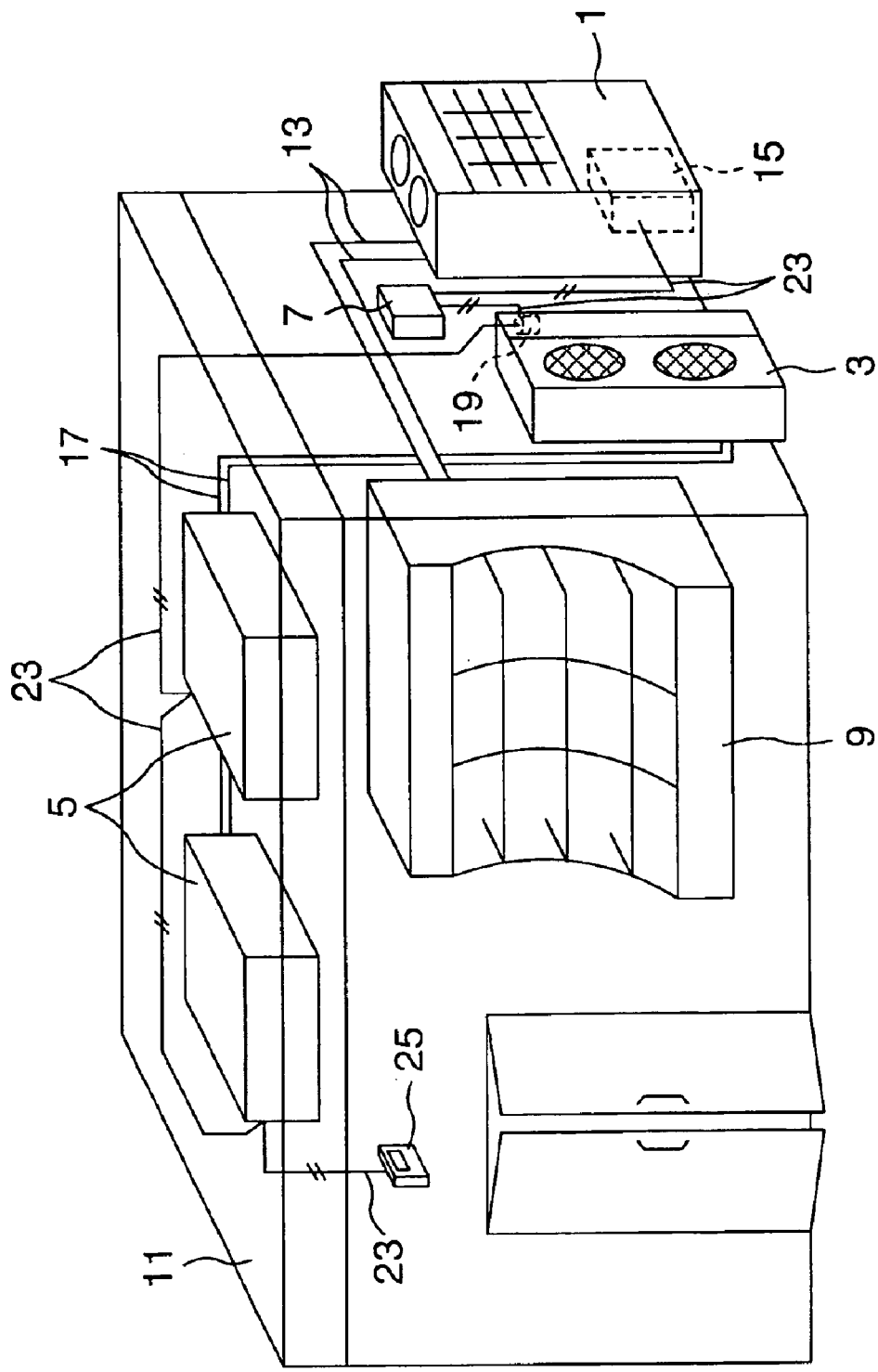
FIG. 1 is a perspective view showing an exemplary state, in which a refrigerating and air-conditioning system, to which the invention is applied, is installed in a store.
Figure 2:
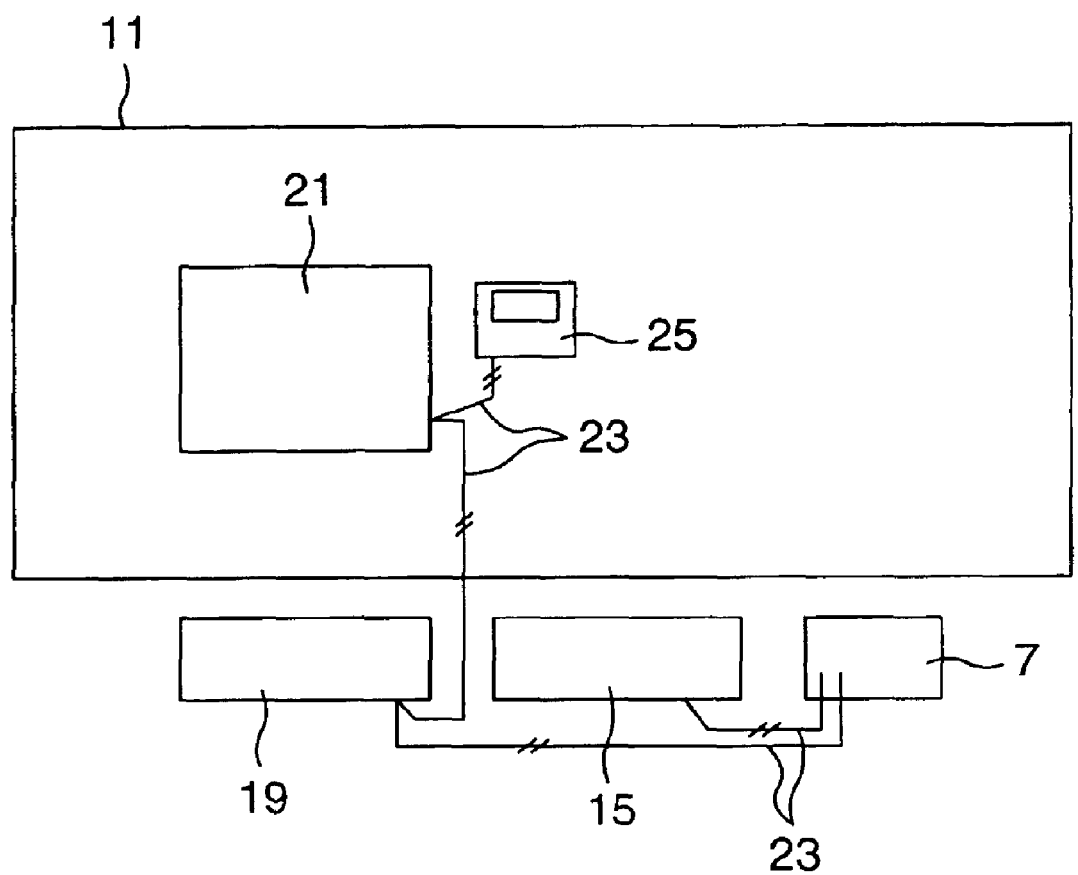
FIG. 2 is a block diagram illustrating a state of connection between respective control units of a refrigerating apparatus and an air-conditioning apparatus, which constitute the refrigerating and air-conditioning system, and a centralized control unit.
Figure 3:
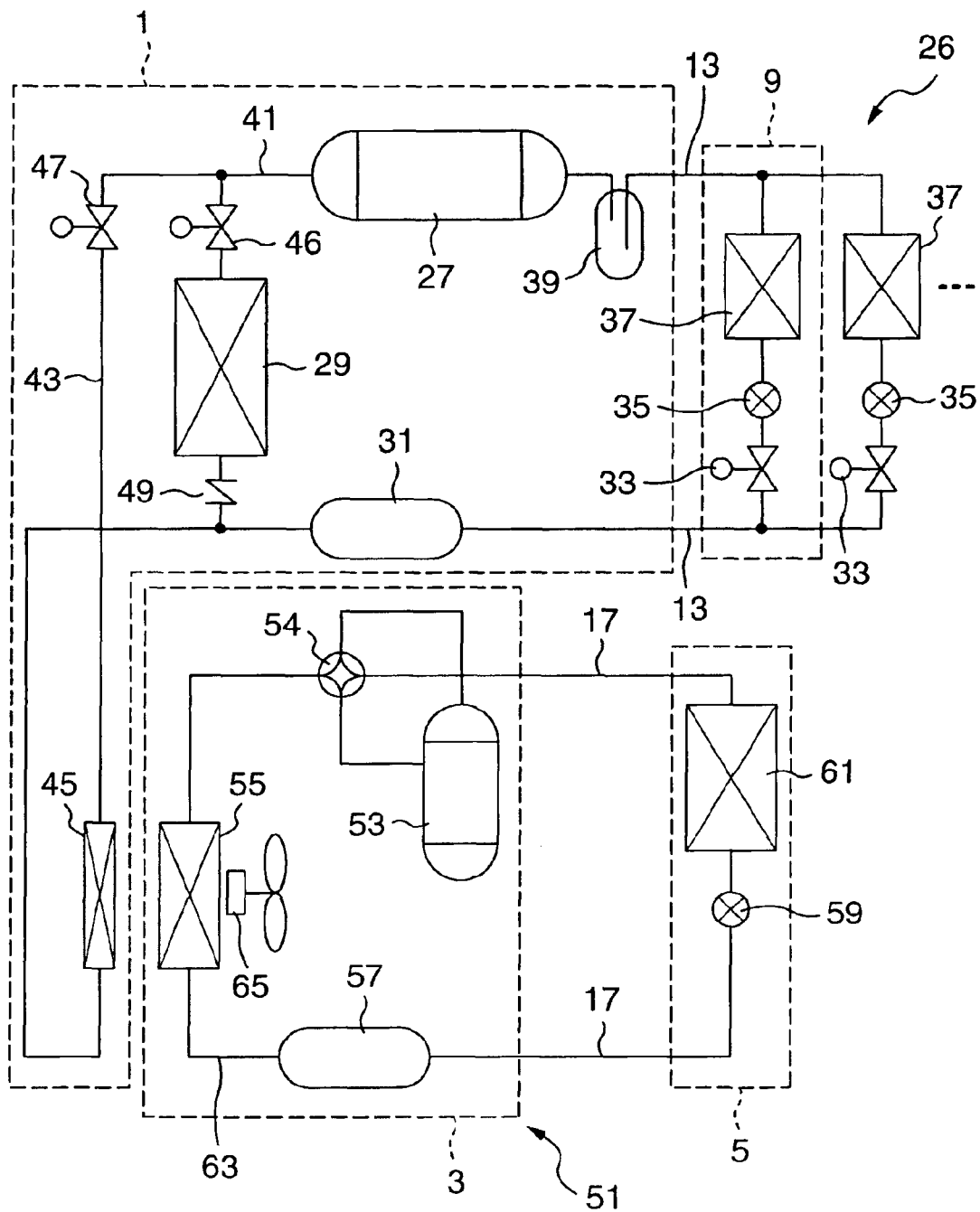
FIG. 3 is a refrigerant circuit diagram showing an example of a refrigerant circuit of a refrigerating apparatus and an air-conditioning apparatus in the refrigerating and air-conditioning system according to the invention.

An embodiment of a refrigerating and air-conditioning system, to which the invention is applied, will be described below with reference to FIGS. 1 to 5. FIG. 1 is a perspective view showing an exemplary state, in which a refrigerating and air-conditioning system, to which the invention is applied, is installed in a store, FIG. 2 is a block diagram illustrating a state of connection between respective control units of a refrigerating apparatus and an air-conditioning apparatus, which constitute the refrigerating and air-conditioning system, and a centralized control unit, FIG. 3 is a refrigerant circuit diagram showing an example of a refrigerant circuit of a refrigerating apparatus and an air-conditioning apparatus in the refrigerating and air-conditioning system according to the invention, and FIGS. 4 and 5, respectively, are flowcharts illustrating examples of an action of the refrigerating and air-conditioning system according to the invention.

A refrigerating and air-conditioning system according to the embodiment comprises, as shown in FIG. 1, a refrigerating machine 1 constituting a refrigerating apparatus, an outdoor equipment 3 and an indoor equipment 5, which constitute an air-conditioning apparatus, and a centralized control unit 7 for controlling the refrigerating machine 1 of the refrigerating apparatus and the air-conditioning apparatus. Further, an open showcase 9 constituting the refrigerating apparatus is installed in a store 11. The refrigerating machine 1 constituting the refrigerating apparatus is installed outside the store 11 and connected to the open showcase 9 installed inside the store 11 via a refrigerant pipe line 13, through which a refrigerant circulates between the refrigerating machine 1 and the open showcase 9. Also, the refrigerating machine 1 comprises a refrigerating machine control unit 15 for controlling an operation thereof. In addition, while FIG. 1 illustrates a state, in which one open showcase 9 is installed in the store 11, the refrigerating machine 1 is connected via the refrigerant pipe line 13 to a plurality of showcases of various types for refrigeration and cold storage.

The outdoor equipment 3 of the air-conditioning apparatus is installed outside the store 11, the indoor equipment 5 is installed inside the store 11, and the outdoor equipment 3 and the indoor equipment 5 of the air-conditioning apparatus are connected to each other via a refrigerant pipe line 17, through which a refrigerant circulates between the outdoor equipment 3 and the indoor equipment 5. Also, the outdoor equipment 3 of the air-conditioning apparatus comprises an outdoor equipment control unit 19 for controlling an operation of the outdoor equipment 3, and the indoor equipment 5 comprises, as shown in FIG. 2, an indoor equipment control unit 21 for controlling an operation of the indoor equipment 5. Further, the outdoor equipment 3 and the indoor equipment 5 of the air-conditioning apparatus are connected to each other via communication lines 23 as shown in FIGS. 1 and 2 to afford giving and receiving electric signals, and a remote control 25 for setting a temperature in the air-conditioning apparatus and giving thereto an operation command is connected electrically to the indoor equipment 5 of the air-conditioning apparatus.

In the embodiment, the centralized control unit 7 is installed outside the store 11 and connected to the refrigerating machine control unit 15 of the refrigerating machine 1 and the outdoor equipment control unit 19 of the outdoor equipment 3 of the air-conditioning apparatus, respectively, via communication lines 23 permitting giving and receiving electric signals. Also, the centralized control unit 7 comprises storage means such as memory or the like (not shown) to be able to store and read data transmitted from the refrigerating machine control unit 15 of the refrigerating machine 1 and the outdoor equipment control unit 19 of the outdoor equipment 3 of the air-conditioning apparatus, and data input directly into the centralized control unit 7.

Here, an explanation will be given to a refrigerant circuit 26 of the refrigerating apparatus, which includes the refrigerating machine 1 and the open showcase 9, and a refrigerant circuit of the air-conditioning apparatus, which includes the outdoor equipment 3 and the indoor equipment 5, these refrigerant circuits constituting the refrigerating and air-conditioning system according to the embodiment. The refrigerant circuit 26 of the refrigerating apparatus comprises, as shown in FIG. 3, a compressor 27, a condenser 29, a receiver 31, a liquid electromagnetic valve 33, an expansion valve 35, an evaporator 37, and an accumulator 39, which are successively provided on a refrigerant flow passage 41 to form a circulating flow passage, thus constituting a basic refrigerating cycle of the refrigerating apparatus. The refrigerating machine 1 includes the compressor 27, the condenser 29, the receiver 31, the accumulator 39, and so on, and the open showcase 9 includes the liquid electromagnetic valve 33, the expansion valve 35, the evaporator 37, and so on. Accordingly, a portion of the refrigerant flow passage 41 between the receiver 31 of the refrigerating machine 1 and the liquid electromagnetic valve 33 of the open showcase 9, and a portion of the refrigerant flow passage 41 between the accumulator 39 of the refrigerating machine 1 and the evaporator 37 of the open showcase 9 make the refrigerant pipe line 13 for connection of the refrigerating machine 1 and the open showcase 9.

Further, although omitted and not shown in FIG. 1, the refrigerating machine 1 according to the embodiment comprises a refrigerant flow passage 43 for utilization of exhaust heat, branching, as shown in FIG. 3, from the refrigerant flow passage 41 between the compressor 27 and the condenser 29 and joining the refrigerant flow passage 41 between the condenser 29 and the receiver 31. The refrigerant flow passage 43 for exhaust heat is provided with a heat exchanger 45 for exhaust heat. Also, electromagnetic valves 46, 47 for controlling flows of the refrigerant to the refrigerant flow passage 41 and the refrigerant flow passage 43 for exhaust heat, respectively, are provided on a portion of the refrigerant flow passage 41 between a branch to the refrigerant flow passage 43 for exhaust heat and the condenser 29 and on a portion of the refrigerant flow passage 43 for exhaust heat upstream of the heat exchanger 45 for exhaust heat with respect to flow of the refrigerant. In order to prevent a refrigerant, which has passed through the heat exchanger 45 for exhaust heat, from flowing backward to the condenser 29, a check valve 49 is provided on a portion of the refrigerant flow passage 41 between a junction with the refrigerant flow passage 43 for exhaust heat and the condenser 29.

In addition, FIG. 3 illustrates the case where a plurality of showcases other than the open showcase 9 are installed. Also, according to the embodiment, data indicative of an operating condition of the compressor 27 of the refrigerating machine 1 are used to detect a state of a load on the open showcase 9, and an operating current and an operating frequency of the compressor 27 are used as data indicative of an operating condition of the compressor 27. Accordingly, although not shown, equipments such as sensors for detecting an operating current and an operating frequency of the compressor 27, and so on are installed in the refrigerating machine 1.

Meanwhile, a refrigerant circuit 51 of the air-conditioning apparatus comprises a compressor 53, a four-way valve 54 for switching of cooling and heating, an outdoor-side heat exchanger 55, a receiver 57, an expansion valve 59, and an indoor-side heat exchanger 61, which are successively provided on a refrigerant flow passage 63 to form a circulating flow passage. With the refrigerant circuit 51 of the air-conditioning apparatus, switching of the four-way valve 54 for switching of cooling and heating causes a refrigerant in the cooling operation to flow through the compressor 53, the four-way valve 54 for switching of cooling and heating, the outdoor-side heat exchanger 55, the receiver 57, the expansion valve 59, and the indoor-side heat exchanger 61 and to return to the compressor 53, and causes the refrigerant in the heating operation to flow through the compressor 53, the four-way valve 54 for switching of cooling and heating, the indoor-side heat exchanger 61, the expansion valve 59, the receiver 57, and the outdoor-side heat exchanger 55, and to return to the compressor 53.

The outdoor equipment 3 of the air-conditioning apparatus includes the compressor 53, the four-way valve 54 for switching of cooling and heating, the outdoor-side heat exchanger 55, the receiver 57, and so on, and the indoor equipment 5 includes the expansion valve 59, the indoor-side heat exchanger 61, and so on. Accordingly, a portion of the refrigerant flow passage 63 between the four-way valve 54 for switching of cooling and heating, in the outdoor equipment 3 and the indoor-side heat exchanger 61 in the indoor equipment 5, and a portion of the refrigerant flow passage 63 between the receiver 57 in the outdoor equipment 3 and the expansion valve 59 in the indoor equipment 5 make the refrigerant pipe line 17 for connection of the outdoor equipment 3 and the indoor equipment 5. The outdoor-side heat exchanger 55 in the outdoor equipment 3 of the air-conditioning apparatus and the heat exchanger 45 for exhaust heat, in the refrigerating machine 1 are provided to be juxtaposed close to each other in a state, in which an air having passed through the heat exchanger 45 for exhaust heat, in the refrigerating machine 1 is caused by rotation of a fan 65 in the outdoor equipment 3 to flow through the outdoor-side heat exchanger 55 in the outdoor equipment 3.

Figure 4:
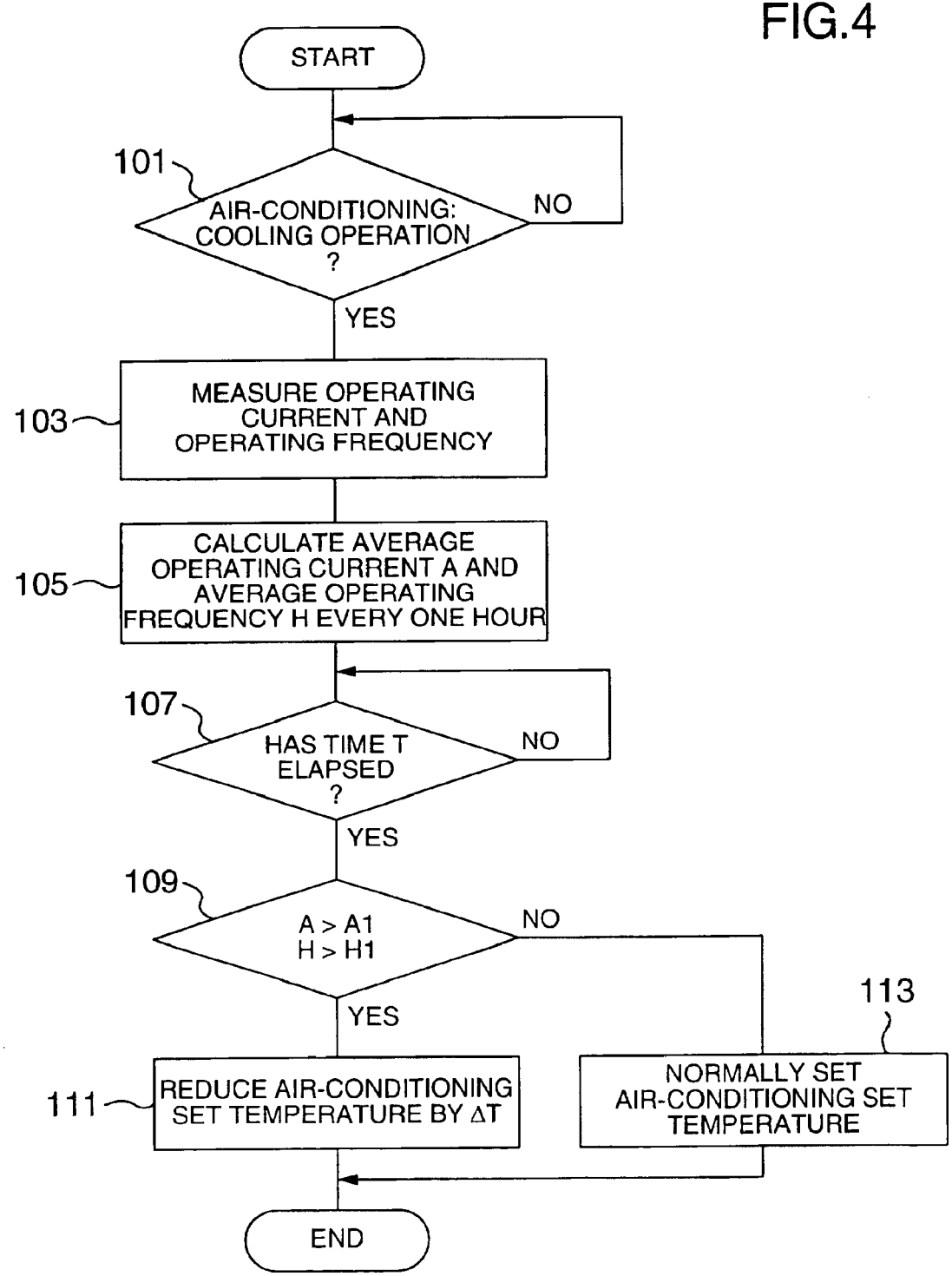
FIG. 4 is a flowchart illustrating an example of an action of the refrigerating and air-conditioning system according to the invention.

An explanation will be given to an operation of the refrigerating and air-conditioning system thus constructed and features of the invention. First, an explanation will be given to the case where the air-conditioning apparatus runs in cooling operation. As shown in FIG. 4, the centralized control unit 7 confirms, on the basis of a signal from the outdoor equipment 3 of the air-conditioning apparatus, whether the air-conditioning apparatus runs in cooling operation (STEP 101). In the case where the air-conditioning apparatus runs in cooling operation, the centralized control unit 7 receives data of those operating current and operating frequency of the compressor 27 of the refrigerating machine 1, which are measured by an equipment provided in the refrigerating machine 1 to be output via the refrigerating machine control unit 15, to store the same in storage means such as memory or the like (not shown) (STEP 103). And from those data of operating current and operating frequency, which are received and stored in STEP 103, calculation is made every preset time, for example, one hour to obtain average values of an operating current and an operating frequency, that is, an average operating current A and an average operating frequency H, during the interval (STEP 105).

Here, beforehand input into the centralized control unit 7 to be set are an operating current reference value A1 and an operating frequency reference value H1, which are determined on the basis of an operating current and an operating frequency at a turning point, at which the refrigerating machine begins to decrease in operating efficiency. Further, input into the centralized control unit 7 to be set is time t making a comparison cycle for comparison between the average operating current A and the average operating frequency H, which are calculated in STEP 105, and the operating current reference value A1 and the operating frequency reference value H1. Accordingly, the centralized control unit 7 makes a comparison between the average operating current A and the average operating frequency H, which are calculated in STEP 105, and the operating current reference value A1 and the operating frequency reference value H1, whenever the time t has elapsed (STEP 107, STEP 109).

In STEP 109, in the case where both the average operating current A and the average operating frequency H are in excess of the operating current reference value A1 and the operating frequency reference value H1, the centralized control unit 7 determines that the refrigerating machine 1 has been increased in operating load and decreased in operating efficiency. And the centralized control unit 7 instructs the remote control 25 connected to the indoor equipment control unit 21 via the outdoor equipment control unit 19 of the outdoor equipment 3 of and the indoor equipment control unit 21 of the air-conditioning apparatus, which carries out air-conditioning inside the store 11, to reduce that set temperature of cooling operation, which is set by a user with the use of the remote control 25, by a temperature ΔT beforehand input into the centralized control unit 7 and set. Thereby, cooling operation is carried out in a state, in which a set temperature in the cooling operation of the air-conditioning apparatus is reduced a temperature ΔT relative to a fixed value (STEP 111).

Meanwhile, in the case where the average operating current A and the average operating frequency H are smaller than the operating current reference value A1 and the operating frequency reference value H1 in STEP 109, the centralized control unit 7 does not modify a set temperature in the cooling operation of the air-conditioning apparatus but carries out the cooling operation at that set temperature, which is set by a user with the use of the remote control 25 (STEP 113). In addition, the centralized control unit 7 can set the temperature ΔT.

In this manner, when in the cooling operation of the air-conditioning apparatus an increase in a load on the open showcase 9, that is, an increase in a load on the refrigerating machine 1 makes the refrigerating machine 1 ready to be decreased in operating efficiency, a set temperature for the air-conditioning apparatus falls a temperature ΔT. Therefore, an indoor temperature in the store 11, in which the open showcase 9 is installed, is decreased by the air-conditioning apparatus, so that a heating value of heat from an outside air, which makes a refrigeration load and a cold storage load on the open showcase 9, is reduced. In this manner, the air-conditioning apparatus being relatively high in operating efficiency and small in energy consumption reduces an indoor temperature in the store 11, thereby enabling reducing a load on the open showcase 9 and preventing reduction in operating efficiency of the refrigerating machine 1, so that the refrigerating and air-conditioning system can be enhanced in operating efficiency and improved in energy saving quality.

Subsequently, an explanation will be given to the case where the air-conditioning apparatus runs in heating operation. In a normal refrigerating cycle of the refrigerating apparatus, a refrigerant is condensed in the condenser 29 of the refrigerating apparatus 1 as shown in FIG. 3, and at this time heat emitted from the condenser 29 is exhausted outside the refrigerating apparatus 1 by a fan (not shown). The centralized control unit 7 confirms, on the basis of a signal from the outdoor equipment 3 of the air-conditioning apparatus, whether the air-conditioning apparatus runs in heating operation, and in the case where the air-conditioning apparatus runs in heating operation, the centralized control unit 7 transmits a signal to the refrigerating machine control unit 15 of the refrigerating machine 1 to inform that the air-conditioning apparatus runs in heating operation. When a signal informing that the air-conditioning apparatus runs in heating operation is received from the centralized control unit 7, the refrigerating machine 1 closes the electromagnetic valve 46 and opens the electromagnetic valve 47 in order to make use of exhaust heat from the refrigerating machine 1. Thereby, a gas refrigerant discharged from the compressor 27 of the refrigerating machine 1 passes through the electromagnetic valve 47 to flow through the heat exchanger 45 for exhaust heat, juxtaposed with the outdoor-side heat exchanger 55 in the outdoor equipment 3 of the air-conditioning apparatus, to be condensed in the heat exchanger 45 for exhaust heat.

Here, the outdoor-side heat exchanger 55 in the outdoor equipment 3 of the air-conditioning apparatus is used as an evaporator in the heating operation. Accordingly, heat discharged from the heat exchanger 45 for exhaust heat, which is used as a condenser in the refrigerating machine 1, is caused by rotation of the fan 65 to flow to the outdoor-side heat exchanger 55 to be absorbed by the outdoor-side heat exchanger 55 serving as an evaporator. Thereby, inlet pressure and inlet gas temperature of the compressor 53 in the outdoor equipment 3 of the air-conditioning apparatus are increased corresponding to a heating value of heat absorbed by the outdoor-side heat exchanger 55, which serves as an evaporator, relative to those in the heating operation, so that the heating capacity is enhanced. Further, when the heat exchanger 45 for exhaust heat is used in the case where the condenser 29 in the refrigerating machine 1 adopts condensing of air cooling type, the fan (not shown) for the condenser 29 can be stopped, so that the fan can be reduced in power consumption.

Subsequently, an explanation will be given to the failure preview and notice function of the refrigerating and air-conditioning system. The refrigerating machine control unit 15 of the refrigerating machine 1 collects, as shown in FIGS. 1 and 2, various operation data of the refrigerating machine 1 to transmit the collected operation data of the refrigerating machine 1 to the centralized control unit 7 via the communication line 23. As the operation data of the refrigerating machine 1, suction-side pressure, discharge-side temperature, and operating current of the compressor 27, as well as secondary current in the case where the compressor 27 is inverter-controlled are detected and used. Reference values for failure preview with respect to respective operation data of the refrigerating machine 1 are input into the centralized control unit 7 to be set. The centralized control unit 7 occasionally makes a comparison between respective operation data and the respective reference values, and in the case where any one of the operation data becomes equal to or larger than its associated reference value, the centralized control unit monitors whether a state in the case continues for a preset period of time, in order to judge whether the case is temporarily abnormal.

In the case where a state, in which any one of the operation data becomes equal to or larger than its associated reference value, continues for a set period of time, the centralized control unit 7 judges that there is a fear of occurrence of a failure and inspection is necessary, and transmits an inspection informing signal informing such judgment, to the outdoor equipment control unit 19 of the outdoor equipment 3 of the air-conditioning apparatus via the communication line 23. Receiving the inspection informing signal, the outdoor equipment 3 of the air-conditioning apparatus transmits the inspection informing signal to the indoor equipment control unit 21 of the indoor equipment 5. Thereby, in the case of provision of a liquid crystal display screen, the remote control 25 of the air-conditioning apparatus displays the necessity of inspection of the refrigerating machine 1 on the liquid crystal display screen to inform such necessity, and in the case of non-provision of any liquid crystal display screen, such necessity is informed by lighting an alarm lamp or the like. Accordingly, even when no communication line connects between the open showcase 9 and the refrigerating machine 1 as in the embodiment, it is possible to inform inside the store 11 that inspection of the refrigerating machine 1 is necessary. In addition, with the embodiment, the centralized control unit 7 receives operation data of the air-conditioning apparatus collected by the outdoor equipment control unit 19 of the outdoor equipment and the indoor equipment control unit 21 of the indoor equipment in the same manner as in the case of the refrigerating machine 1 to compare the same with preset reference values to determine necessity of inspection to inform the same via the remote control 25.

In this manner, with the refrigerating and air-conditioning system according to the embodiment, since a set temperature in the cooling operation of the air-conditioning apparatus is reduced a temperature $\Delta T$ relative to a fixed value according to a load on the open showcase 9, a heating value of heat from an outside air, which makes a refrigeration load and a cold storage load on the open showcase 9, is reduced by the air-conditioning apparatus, which is relatively high in operating efficiency and small in energy consumption. Further, since a load on the open showcase 9 is reduced, it is possible to prevent the refrigerating machine 1 from being decreased in operating efficiency. Accordingly, it is possible to improve the energy saving quality.

Further, when a load on the open showcase becomes maximum, the refrigerating machine performs control trying to follow the load on the open showcase by increasing the operating frequency of the compressor to a maximum frequency. When an outside air temperature rises temporarily in summer season in this occasion, however, an operating current of the compressor of the refrigerating machine reaches in some cases a control threshold value and the refrigerating machine stops depending upon a ratio of an increase in outside air temperature. Also, when the refrigerating machine stops, the open showcase rises in temperature and cannot be in some cases maintained at a necessary temperature. With the refrigerating and air-conditioning system according to the embodiment, however, since temperature inside the store 11 is reduced by reducing a set temperature in the cooling operation of the air-conditioning apparatus a temperature ΔT relative to a fixed value according to a load on the open showcase 9, stoppage of the refrigerating machine, which an operating current of the compressor of the refrigerating machine reaches a control threshold value to cause, is hard to occur.

Hereupon, showcases such as the open showcase 9 of the refrigerating machine and refrigerating machines are in some cases manufactured by different manufacturers such that a certain manufacturer delivers showcases and another manufacturer delivers an air-conditioning apparatus and a refrigerating machine. In this occasion, when trying to detect a loaded condition of a showcase from data of an operating state of the showcase, there is produced a need of connecting the showcase and the refrigerating machine by means of a communication line. Accordingly, there is produced a need for communication equipments and wirings, conversion equipments of signals for correspondence in communication standards between the showcase and the refrigerating machine, and reconstruction of the showcase and the refrigerating machine, thus bringing about complexity in a work of installation of the refrigerating apparatus and an increase in cost.

In contrast, with the refrigerating and air-conditioning system according to the embodiment, the centralized control unit 7 detects a loaded condition of the open showcase 9 by means of an operating current and an operating frequency of the compressor 27, which make data of that operating state of the compressor 27 of the refrigerating machine 1, which varies corresponding to a loaded condition of the open showcase 9. Accordingly, there is no need of connecting the open showcase 9 and the refrigerating machine 1 by means of any communication line. In addition, a suction-side pressure of the compressor 27, a discharge-side temperature of the compressor 27, and the like can be also used as data of the operating state of the compressor 27 of the refrigerating machine 1 corresponding to a loaded condition of the open showcase 9.

Further, with the refrigerating and air-conditioning system according to the embodiment, the centralized control unit 7 monitors data of the operating state of the refrigerating machine 1, judges the necessity of inspection before abnormality and failure are caused in the refrigerating machine, and transmits an inspection informing signal, which informs such judgment, to the air-conditioning apparatus, to be able to inform the necessity of inspection of the refrigerating machine 1 inside the store 11 via the remote control 25 of the air-conditioning apparatus. Accordingly, even if the refrigerating machine 1 and the open showcase 9 are not connected to each other by any communication line, the necessity of inspection of the refrigerating machine 1 can be informed inside the store 11.

In addition, with the refrigerating and air-conditioning system according to the embodiment, the centralized control unit 7 monitors data of the operating state of the air-conditioning apparatus to judge the necessity of inspection before abnormality and failure are caused in the air-conditioning apparatus. Accordingly, since the centralized control unit 7 collects operating data of the refrigerating and air-conditioning system collectively to be able to periodically diagnose operating states of the respective equipments, preventive maintenance of the respective equipments of the refrigerating and air-conditioning system is achieved by information inside the store 11 before abnormal stoppage, systemdown, or the like is caused, thus enabling failure of the equipments beforehand.

Further, with the refrigerating and air-conditioning system according to the embodiment, since exhaust heat from the refrigerating machine 1 is made use of when the air-conditioning apparatus runs in heating operation, it is possible to reduce energy consumption of the air-conditioning apparatus in heating operation, thus enabling improving the energy saving quality further.

In addition, with the refrigerating and air-conditioning system according to the embodiment, the provision of the centralized control unit 7 makes it possible to assist operation of the refrigerating machine 1 with the use of the air-conditioning apparatus and to assist operation of the air-conditioning apparatus with the use of the refrigerating machine 1, so that energy saving in the whole store 11 and merchandise management in high freshness can be realized by generally and reasonably controlling the refrigerating apparatus and the air-conditioning apparatus installed in the store 11.

Also, with the embodiment, while the centralized control unit 7 is installed outside the store 11, it can be installed in a house such as the store 11 or the like, and inside the refrigerating machine 1. In this occasion, the centralized control unit 7 can also be connected to the indoor equipment control unit 21 of the indoor equipment 5 of the air-conditioning apparatus.

Also, with the embodiment, while the necessity of inspection for the refrigerating machine 1 and the air-conditioning apparatus is informed by means of the remote control 25, other display devices can be installed in the store 11 to inform the necessity of inspection. Further, in the case where the centralized control unit 7 is disposed inside the store 11, a display unit for informing of the necessity of inspection can be provided in the centralized control unit 7.

Figure 5:
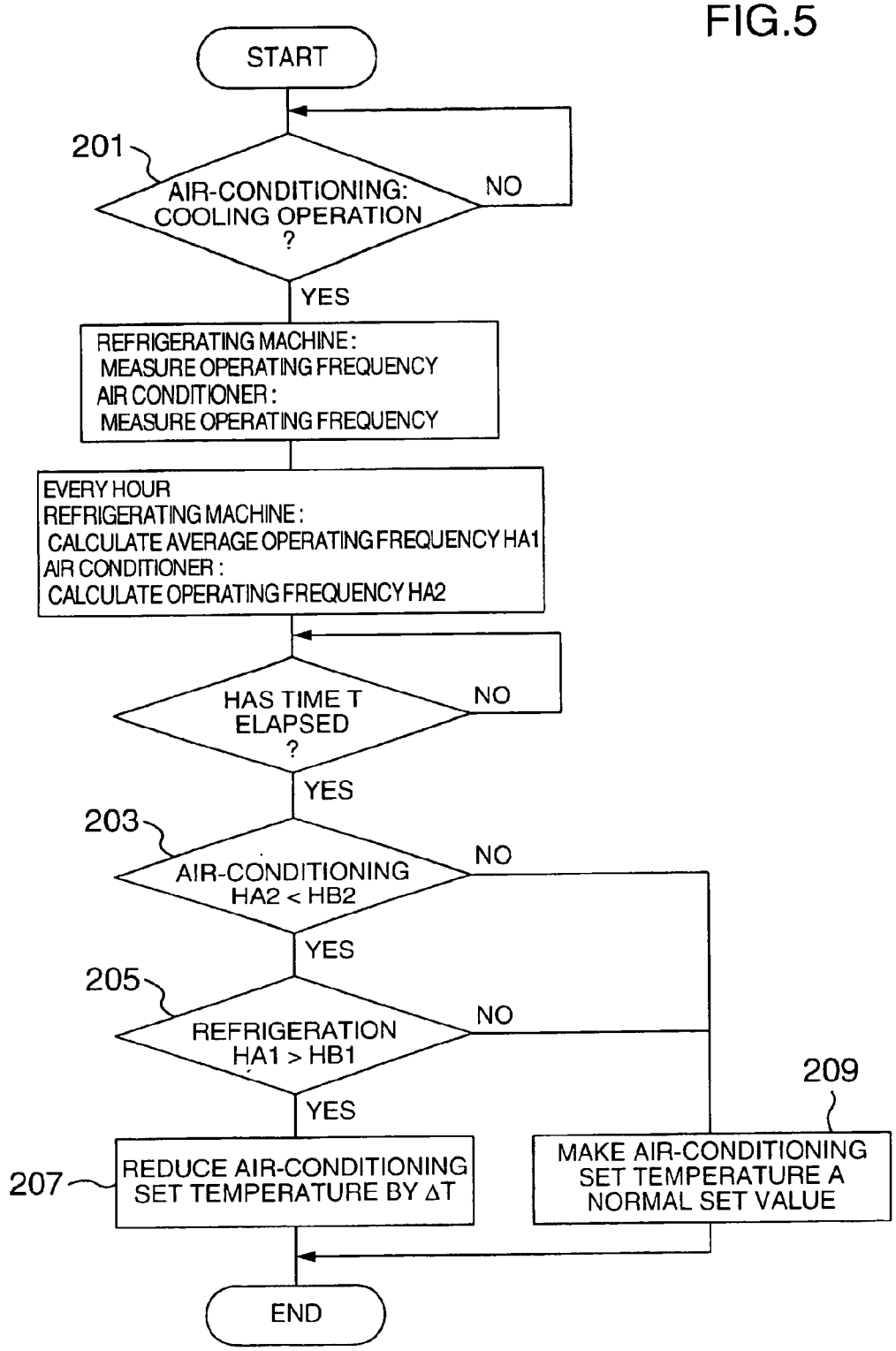
FIG. 5 is a flowchart illustrating another example of an action of the refrigerating and air-conditioning system according to the invention.

Subsequently, other examples of control action in the refrigerating and air-conditioning system constructed in the manner shown in FIGS. 1 to 3 will be described with reference to FIG. 5.

First, an explanation will be given to the case where the air-conditioning apparatus runs in cooling operation. The centralized control unit 7 confirms, on the basis of a signal from the outdoor equipment 3 of the air-conditioning apparatus, whether the air-conditioning apparatus runs in cooling operation (STEP 201). In the case where the air-conditioning apparatus runs in cooling operation, the centralized control unit 7 receives data of that operating frequency of the compressor 27 of the refrigerating machine 1, which is measured by an equipment provided in the refrigerating machine 1 to be output via the refrigerating machine control unit 15, to store the same in storage means such as memory or the like (not shown). Also, in the air-conditioning apparatus, data of that operating frequency of the air-conditioning compressor 53, which is measured by an equipment provided in the outdoor equipment 3 to be output via the outdoor equipment control unit 19, are received to be stored in storage means such as memory or the like (not shown). From data of operating frequencies of the refrigerating machine 1 and the outdoor equipment 3 of the air-conditioning apparatus, which are received by the centralized control unit 7 to be stored, average values of operating frequencies in this period of time are calculated every preset time, for example, one hour. Here, HA1 and HA2 indicate average operating frequencies of the refrigerating machine 1 and the outdoor equipment 3 of the air-conditioning apparatus.

Here, beforehand input into the centralized control unit 7 to be set is an operating frequency reference value HB1 determined on the basis of an operating frequency at a turning point, at which a decrease in operating efficiency begins due to an increase in a load on the open showcase 9 connected to the refrigerating machine. Also, beforehand input into the outdoor equipment 3 of the air-conditioning apparatus to be set is an operating frequency reference value HB2 determined on the basis of an operating frequency at a turning point, at which a decrease in operating efficiency begins due to an increase in an air-conditioning load on the indoor equipment 5 inside the store 11. Further, input into the centralized control unit 7 to be set is time t making a comparison cycle for comparison between the average operating frequencies HA1 and HA2 and the operating current reference values HB1 and HB2. Accordingly, the centralized control unit 7 makes a comparison between the average operating frequencies HA1 and HA2, which are calculated whenever the time t has elapsed, and the operating current reference values HB1 and HB2 (STEP 203, STEP 205).

In STEP 203, the centralized control unit 7 judges that an air-conditioning load on the air-conditioning apparatus in the store 11 is small and a margin is left in operation, in the case where the average operating frequency HA2 of the outdoor equipment 3 of the air-conditioning apparatus is lower than the operating current reference value HB2.

In STEP 205, the centralized control unit 7 judges that an operating load on the refrigerating machine 1 increases and a decrease in operating efficiency is caused, in the case where the average operating frequency HA1 of the refrigerating machine 1 is in excess of the operating current reference value HB1.

And the centralized control unit 7 instructs the remote control 25 connected to the indoor equipment control unit 21 via the outdoor equipment control unit 19 of and the indoor equipment control unit 21 of the air-conditioning apparatus, which carries out air-conditioning inside the store 11, to reduce that set temperature of cooling operation, which is set by a user with the use of the remote control 25, by a temperature $\Delta T$ beforehand input into the centralized control unit 7 and set. Thereby, cooling operation is carried out in a state, in which a set temperature in the cooling operation of the air-conditioning apparatus is reduced a temperature $\Delta T$ relative to a fixed value (STEP 207).

Meanwhile, in the case where the average operating frequency HA2 of the outdoor equipment 3 of the air-conditioning apparatus is in excess of the operating current reference value HB2 in STEP 203 and in the case where the average operating frequency HA1 of the refrigerating machine 1 is smaller than the operating current reference value HB1 in STEP 205, the centralized control unit 7 does not modify a set temperature for the cooling operation of the air-conditioning apparatus but carries out the cooling operation at that set temperature for the cooling operation, which is set by a user with the use of the remote control 25 (STEP 209). In addition, the centralized control unit 7 can set the temperature $\Delta T$.

In this manner, when in the cooling operation of the air-conditioning apparatus an increase in a load on the open showcase 9, that is, an increase in a load on the refrigerating machine 1 makes the refrigerating machine 1 ready to be decreased in operating efficiency, a set temperature for the air-conditioning apparatus falls a temperature $\Delta T$. Therefore, an indoor temperature in the store 11, in which the open showcase 9 is installed, is reduced by the air-conditioning apparatus, so that a heating value of heat from an outside air, which makes a refrigeration load and a cold storage load on the open showcase 9, is reduced. In this manner, the air-conditioning apparatus being relatively high in operating efficiency and small in energy consumption reduces an indoor temperature in the store 11, thereby enabling reducing a load on the open showcase 9 and preventing reduction in operating efficiency of the refrigerating machine 1, so that the refrigerating and air-conditioning system can be enhanced in operating efficiency and improved in energy saving quality.

Other examples of control action with the use of the control method will be described with reference to FIG. 5. In the case where the average operating frequency HA2 of the outdoor equipment 3 of the air-conditioning apparatus is smaller than the operating frequency reference value HB2 in STEP 203, the centralized control unit 7 judges that an air-conditioning load on the air-conditioning apparatus in the store 11 is small and a margin is left in operation.

Subsequently, in the case where the average operating frequency HA1 of the refrigerating machine 1 is in excess of the operating frequency reference value HB1 in STEP 205, the centralized control unit 7 judges that an operating load on the refrigerating machine 1 increases and a decrease in operating efficiency is caused.

In the case of this condition, the centralized control unit 7 instructs the outdoor equipment control unit 19 of the air-conditioning apparatus, which carries out air-conditioning inside the store 11, to increase an operating frequency of the air-conditioning compressor 53 by a frequency $\Delta H$, which is beforehand input into the centralized control unit 7 to be set. Thereby, the cooling operation is carried out in a state, in which an operating frequency in the cooling operation of the air-conditioning apparatus is increased a frequency $\Delta H$ relative to a fixed value.

Meanwhile, in the case where the average operating frequency HA2 of the outdoor equipment 3 of the air-conditioning apparatus is in excess of the operating current frequency value HB2 in STEP 203 and in the case where the average operating frequency HA1 of the refrigerating machine 1 is smaller than the operating frequency reference value HB1 in STEP 205, the centralized control unit 7 does not modify an operating frequency of the compressor 53 in the outdoor equipment 3 of the air-conditioning apparatus but carries out the cooling operation at an original frequency. In addition, the frequency $\Delta H$ can be set in the centralized control unit 7.

In this manner, when in the cooling operation of the air-conditioning apparatus an increase in a load on the open showcase 9, that is, an increase in a load on the refrigerating machine 1 makes the refrigerating machine 1 ready to be decreased in operating efficiency, an operating frequency of the air-conditioning apparatus is increased $\Delta H$. Therefore, an indoor temperature in the store 11, in which the open showcase 9 is installed, is reduced by the air-conditioning apparatus, so that a heating value of heat from an outside air, which makes a refrigeration load and a cold storage load on the open showcase 9, is reduced. In this manner, the air-conditioning apparatus having a good operating efficiency reduces an indoor temperature in the store 11 to thereby enable decreasing a load on the open showcase 9 and preventing reduction in operating efficiency of the refrigerating machine 1. Accordingly, the refrigerating and air-conditioning system can be enhanced as a whole in operating efficiency and improved in energy saving quality.

Subsequently, an explanation will be given to the case where the air-conditioning apparatus runs in heating operation. In a normal refrigerating cycle of the refrigerating apparatus, a refrigerant is condensed in the condenser 29 of the refrigerating apparatus 1 as shown in FIG. 3, and at this time heat emitted from the condenser 29 is exhausted outside the refrigerating apparatus 1 by a fan or the like. The centralized control unit 7 confirms, on the basis of a signal from the outdoor equipment 3 of the air-conditioning apparatus, whether the air-conditioning apparatus runs in heating operation, and in the case where the air-conditioning apparatus runs in heating operation, the centralized control unit 7 transmits a signal to the refrigerating machine control unit 15 to inform that the air-conditioning apparatus runs in heating operation. When a signal informing that the air-conditioning apparatus runs in heating operation is received from the centralized control unit 7, the refrigerating machine 1 closes the electromagnetic valve 46 and opens the electromagnetic valve 47 in order to make use of exhaust heat from the refrigerating machine 1. Thereby, a gas refrigerant discharged from the compressor 27 flows through the heat exchanger 45 for exhaust heat to be condensed therein. The heat exchanger 45 for exhaust heat can be installed in the store 11, of which a concrete example is described below.

The heat exchanger 45 for exhaust heat, installed in the store 11 is used as a condenser in operation of the refrigerating machine 1, and exhaust heat generated in condensing of a refrigerant is returned to the interior of the store 11. Thereby, the store 11 rises in temperature and the air-conditioning apparatus is reduced in heating load. Accordingly, an operating frequency of the air-conditioning compressor 53 in the outdoor equipment 3 of the air-conditioning apparatus is decreased, thus enabling achieving reduction in power consumption of the air-conditioning apparatus.

A further preferred embodiment of the refrigerating and air-conditioning system according to the invention will be described.

The air-conditioning apparatus is operated by the remote control 25 connected to the indoor equipment 5. In the case where an interior of the store 11 is hot in cooling operation, a set temperature is manually reduced with the use of the remote control 25 but the set temperature in the remote control 25 is in many cases not returned to an original set value even when the interior of the store 11 is reduced in temperature to become cool. In such case, since the set temperature is lower than usual, the air-conditioning apparatus is increased in operating rate to lead to an increase in power consumption. In order to solve this, the function of setting a reference cooling set value TRK is included in the remote control 25 according to the embodiment. In the case where the interior of the store 11 rises in temperature in cooling operation and a set temperature is manually reduced with the use of the remote control 25, time is counted since this point of time and when it reaches a preset time, control is performed to automatically return a set temperature of the remote control 25 to the reference cooling set value TRK. Owing to this automatic return control of set temperature, it is possible to avoid a wasteful air-conditioning operation possibly caused by excessive reduction of a set temperature and to achieve reduction in power consumption.

The same control as in cooling operation is possible in the case where the air-conditioning apparatus runs in heating operation. More specifically, the function of setting a reference heating set value TDK is included in the remote control 25. Thus, in the case where the interior of the store 11 is cold in heating operation and a set temperature is manually raised with the use of the remote control 25, time is counted since this point of time and when time preset in the remote control has elapsed, control is performed to automatically return a set temperature of the remote control to the reference heating set value TDK. Owing to this automatic return control of a set temperature, it is possible to avoid a wasteful operation of the air-conditioning apparatus possibly caused by excessive raising of a set temperature and to achieve reduction in power consumption.

In addition, the invention is not limited to the refrigerating apparatus and the air-conditioning apparatus, which are constructed in the above-mentioned manner, but likewise applicable to a refrigerating and air-conditioning system, in which a refrigerating apparatus and an air-conditioning apparatus constructed in various manners and having independent refrigerant circuits are combined together.

According to the invention, a showcase is installed in a room, which is air-conditioned by an air-conditioning apparatus, and an indoor set temperature in the air-conditioning apparatus is reduced relative to a fixed value according to a load on the showcase to effect operation, or a refrigerating machine and an air-conditioning apparatus are operated under an operating condition that energy consumption of both the refrigerating machine and the air-conditioning apparatus enables a further energy saving, so that there is produced an effect that the energy saving quality can be improved.

While the above descriptions have been made with respect to the embodiments, the invention is not limited thereto but it is apparent to those skilled in the art that various changes and modifications can be made within the sprit of the invention and the scope of the appended claims.

What is claimed is:

1. A refrigerating and air-conditioning system comprising a refrigerating machine connected to a showcase by a first refrigerant flow passage to form a refrigerating apparatus, an air-conditioning apparatus for connection of an indoor equipment and an outdoor equipment by means of a second refrigerant flow passage, which forms a different refrigerant circuit from a refrigerant circuit formed by the first refrigerant flow passage, and a centralized control unit for controlling actions of the refrigerating machine and the air-conditioning apparatus, and wherein the showcase is installed in a room air-conditioned by the air-conditioning apparatus, and the centralized control unit is configured to reduce an indoor set temperature set by the air-conditioning apparatus relative to a fixed value according to a load on the showcase for operation, wherein the centralized control unit is configured to detect a loaded condition of the showcases making use of data indicative of an operating state of a compressor provided in the refrigerating machine, and wherein the centralized control unit uses an operating current and an operating frequency of the compressor provided in the refrigerating machine as data indicative of an operating state of the compressor, calculates an average operating current and an average operating frequency for the operating current and the operating frequency in a set period of time, and reduces a indoor set temperature in the air-conditioning apparatus relative to a fixed value according to the average operating current and the average operating frequency thus calculated for operation.

2. A refrigerating and air-conditioning system comprising a refrigerating machine connected to a showcase by a first refrigerant flow passage to form a refrigerating apparatus, an air-conditioning apparatus for connection of an indoor equipment and an outdoor equipment by means of a second refrigerant flow passage, which forms a different refrigerant circuit from a refrigerant circuit formed by the first refrigerant flow passage, and a centralized control unit for controlling actions of the refrigerating machine and the air-conditioning apparatus, and wherein the showcase is installed in a roam air-conditioned by the air-conditioning apparatus, and the centralized control unit is configured to reduce an indoor set temperature set by the air-conditioning apparatus relative to a fixed value according to a load on the showcase for operation, wherein the centralized control unit acquires and stores data indicative of an operating state of the compressor provided in the refrigerating machine, judges the necessity of inspection of the refrigerating machine on the basis of the data indicative of the compressor, and outputs a signal, which informs such judgment, to the air-conditioning apparatus when inspection is judged to be necessary.

3. A refrigerating and air-conditioning system comprising a refrigerating machine connected to a showcase by a first refrigerant flow passage to form a refrigerating apparatus, an air-conditioning apparatus for connection of an indoor equipment and an outdoor equipment by means of a second refrigerant flow passage, which forms a different refrigerant circuit from a refrigerant circuit formed by the first refrigerant flow passage, and a centralized control unit for controlling actions of the refrigerating machine and the air-conditioning apparatus, and wherein the showcase is installed in a room air-conditioned by the air-conditioning apparatus, and the centralized control unit gathers operation data of the refrigerating machine and the air-conditioning apparatus to operate the refrigerating machine and the air-conditioning apparatus under an operating condition that energy consumption of both the refrigerating machine and the air-conditioning apparatus affords energy saving, wherein the centralized control unit detects operation pressure, temperature, compressor frequency, abnormality signal, and protective control signal in the refrigerating machine, and operation pressure, temperature, compressor frequency, abnormality signal, and remote control set temperature in the air-conditioning apparatus to control the refrigerating machine and the air-conditioning apparatus on the basis of such detection data.

4. A refrigerating and air-conditioning system comprising a refrigerating machine connected to a showcase by a first refrigerant flow passage to form a refrigerating apparatus, an air-conditioning apparatus for connection of an indoor equipment and an outdoor equipment by means of a second refrigerant flow passage, which forms a different refrigerant circuit from a refrigerant circuit formed by the first refrigerant flow passage, and a centralized control unit for controlling actions of the refrigerating machine and the air-conditioning apparatus, and wherein the showcase is installed in a room air-conditioned by the air-conditioning apparatus, and the centralized control unit gathers operation data of the refrigerating machine and the air-conditioning apparatus to operate the refrigerating machine and the air-conditioning apparatus under an operating condition that energy consumption of both the refrigerating machine and the air-conditioning apparatus affords energy saving, wherein when the air-conditioning apparatus runs in cooling operation and in the case where it is judged that a compressor operating frequency of the refrigerating machine is larger than a preset reference value and an operating load of the refrigerating machine is larger than a reference value even after the lapse of a predetermined period of time, and in the case where it is judged that a compressor operating frequency of the air-conditioning apparatus is smaller than a preset reference value and an operating load of the air-conditioning apparatus is smaller than a reference value even after the lapse of a predetermined period of time, the centralized control unit increases a compressor operating frequency of the air-conditioning apparatus to thereby reduce an operating load of the refrigerating machine and controls the air-conditioning apparatus and the refrigerating machine so that the whole refrigerating and air-conditioning system becomes best in operating efficiency.

5. The refrigerating and air-conditioning system according to claim 4, wherein a reference set temperature in cooling operation is beforehand stored, and when in order to reduce an operating load of the refrigerating machine, a compressor rotating speed on a side of the air-conditioning apparatus is temporarily increased to reduce temperature in a room, the temperature is automatically returned to the reference set temperature after the lapse of a predetermined period of time to reduce power consumption of the air-conditioning apparatus.

6. A refrigerating and air-conditioning system comprising a refrigerating machine connected to a showcase by a first refrigerant flow passage to form a refrigerating apparatus, an air-conditioning apparatus for connection of an indoor equipment and an outdoor equipment by means of a second refrigerant flow passage, which forms a different refrigerant circuit from a refrigerant circuit formed by the first refrigerant flow passage, and a centralized control unit for controlling actions of the refrigerating machine and the air-conditioning apparatus, and wherein the showcase is installed in a room air-conditioned by the air-conditioning apparatus, and the centralized control unit gathers operation data of the refrigerating machine and the air-conditioning apparatus to operate the refrigerating machine and the air-conditioning apparatus under an operating condition that energy consumption of both the refrigerating machine and the air-conditioning apparatus affords energy saving, wherein in the case where it is judged that a compressor operating frequency of the refrigerating machine is smaller than a preset reference value and an operating load of the refrigerating machine is smaller than a reference value even after the lapse of a predetermined period of time, and in the case where it is judged that a compressor operating frequency of the air-conditioning apparatus is larger than a preset reference value and an operating load of the air-conditioning apparatus is larger than a reference value even after the lapse of a predetermined period of time, the centralized control unit increases a compressor operating frequency of the refrigerating machine to thereby reduce an operating load of the air-conditioning apparatus and controls the refrigerating machine and the air-conditioning apparatus so that the whole refrigerating and air-conditioning system becomes best in operating efficiency.

7. A refrigerating and air-conditioning system comprising a refrigerating machine connected to a showcase by a first refrigerant flow passage to form a refrigerating apparatus, an air-conditioning apparatus for connection of an indoor equipment and an outdoor equipment by means of a second refrigerant flow passage, which forms a different refrigerant circuit from a refrigerant circuit formed by the first refrigerant flow passage, and a centralized control unit for controlling actions of the refrigerating machine and the air-conditioning apparatus, and wherein the showcase is installed in a room air-conditioned by the air-conditioning apparatus, and the centralized control unit gathers operation data of the refrigerating machine and the air-conditioning apparatus to operate the refrigerating machine and the air-conditioning apparatus under an operating condition that energy consumption of both the refrigerating machine and the air-conditioning apparatus affords enemy saving, wherein when the air-conditioning apparatus runs in heating operation and in the case where it is judged that a compressor operating frequency of the refrigerating machine is larger than a preset reference value and an operating load of the refrigerating machine is larger than a reference value even after the lapse of a predetermined period of time, control is performed to reduce an indoor set temperature in the air-conditioning apparatus.

8. A refrigerating and air-conditioning system comprising a refrigerating machine connected to a showcase by a first refrigerant flow passage to form a refrigerating apparatus, an air-conditioning apparatus for connection of an indoor equipment and an outdoor equipment by means of a second refrigerant flow passage, which forms a different refrigerant circuit from a refrigerant circuit formed by the first refrigerant flow passage, and a centralized control unit for controlling actions of the refrigerating machine and the air-conditioning apparatus, and wherein the showcase is installed in a room air-conditioned by the air-conditioning apparatus, and the centralized control unit is configured to reduce an indoor set temperature set by the air-conditioning apparatus relative to a fixed value according to a load on the showcase for operation, wherein the refrigerating machine comprises a heat exchanger for exhaust heat, capable of conducting heat to a heat exchanger provided in the outdoor equipment of the air-conditioning apparatus, and the centralized control unit causes the first refrigerant to flow through the heat exchanger for exhaust heat, provided in the refrigerating machine when the refrigerating machine runs in cooling operation and the air-conditioning apparatus runs in heating operation, whereby heat discharged from the heat exchanger for exhaust heat is conducted to the heat exchanger provided in the outdoor equipment of the air-conditioning apparatus.

* * * * *

UNITED STATES PATENT AND TRADEMARK OFFICE
CERTIFICATE OF CORRECTION

PATENT NO. : 6,938,429 B2
DATED : September 6, 2005
INVENTOR(S) : Katogi et al.

It is certified that error appears in the above-identified patent and that said Letters Patent is hereby corrected as shown below:

Title page,
Item [73], Assignee, should read:
-- Hitachi, Ltd., trustee, for the benefit of
Hitachi Air Conditioning Systems Co., Ltd.
Tokyo, Japan --.

Signed and Sealed this

Twentieth Day of December, 2005

JON W. DUDAS
*Director of the United States Patent and Trademark Office*